UNITED STATES PATENT OFFICE.

HENRY A. HUGHES, JR., OF PHILADELPHIA, PENNSYLVANIA, ASSIGNOR TO PERFECTION JAR CLOSURE COMPANY, OF PHILADELPHIA, PENNSYLVANIA, AND CAMDEN, NEW JERSEY, A CORPORATION OF NEW JERSEY.

COMPOSITION OF MATTER.

SPECIFICATION forming part of Letters Patent No. 691,383, dated January 21, 1902.

Application filed January 17, 1901. Serial No. 43,640. (No specimens.)

*To all whom it may concern:*

Be it known that I, HENRY A. HUGHES, Jr., a citizen of the United States, residing in Philadelphia, Pennsylvania, have invented a certain new and Improved Composition of Matter, of which the following is a specification.

My invention relates to a composition of matter having a combined glutinous and mucilaginous base, which base is rendered insoluble during the process of manufacture.

My improved compound may be used for a number of purposes; but its principal use is as a sealing-closure for jars or bottles.

My improved composition of matter is prepared mechanically preferably in the presence of heat, and when in a slightly liquid or plastic condition it should be disposed of or arranged for future use before drying. During coagulation and the subsequent drying operation the ingredients undergo a chemical change, and the resulting product is hard, tough, insoluble and infusible, impervious to air or moisture, but possessing the property of becoming resilient or rubber-like in the presence of moisture. This property renders such product of especial value in certain commercial industries, and in a companion application filed of even date herewith I have described and claimed such use.

The ingredients and their proportions by weight used in preparing my new and improved composition of matter are as follows: acid solution, two to five ounces; gluten, (dissolved in an acid solution,) two to four ounces; gelatin, one to three ounces; glucose, two to four ounces; kaolin, (or other earth,) one to four ounces; formaldehyde, (forty-per-cent. solution,) one to five grams; oil of wintergreen, (to deodorize,) a sufficient quantity; water, (to thin,) a sufficient quantity.

The above ingredients in about the proportions noted are such as I prefer to use in preparing my improved compound.

In preparing the acid solution I prefer to use acetic acid, though I do not wish to limit myself to the use of such acid, as other acids may be advantageously employed, especially those of the vegetable class. In place of the glucose I may employ glycerin when it is desired to cheapen the product, and in place of the kaolin I may use any other suitable earthy filler, such as clay, fullers' earth, or the like. The oil of wintergreen is added for the purpose of dissipating or removing the slightly-offensive odor of the acid solution.

In preparing my improved composition of matter I proceed as follows, using a suitable digesting vessel arranged in a water-bath, which is preferably warm: The acid solution which I employ as a solvent is placed in such digesting vessel, and to this is added the gluten dissolved in a similar acid solution and then the dry gelatin. After this mixture has been well stirred, so that the ingredients are thoroughly incorporated, the glucose and kaolin are added and well stirred in. If the resulting mixture is very thick and heavy, a sufficient quantity of water to bring it to the consistency of thick paint may be added. The resulting mixture will be found to be very odorous, due to the presence of the acid solution and the heat, and for the purpose of rendering such odor unobjectionable the oil of wintergreen is added. After this has been done the formaldehyde is added, thoroughly stirred into the mixture, and the latter is then ready to be prepared for future use.

As noted above, the mixture should be about the consistency of thick paint, and to prepare the same for subsequent use it should be spread out in a thin sheet and allowed to dry, or the articles with which it is to be used should be coated with a thin covering, which is allowed to dry upon the same.

In the new and improved compound which I have discovered I employ a solution of gluten to give such compound the necessary toughness and elasticity, to prevent rupture of the same when under the vacuum test, and to prevent the filtration of air. The gelatin is employed because it combines with the gluten, and the two so combined hold in a membranous network the other ingredients of the compound. With the addition of the formaldehyde to the combined gelatin and gluten the natural brittleness and friableness of the gelatin are modified and at the same time both ingredients are rendered insoluble. Kaolin or other earthy substance is employed to render the resulting product sufficiently hard and also to divide the strain through the mass when shrinkage takes place during the drying operation. To lessen such shrinkage and to prevent entirely the cracking when drying, the glucose or glycerin is added. The addition of the formaldehyde also renders the compound insoluble or non-diffusible. I prefer to use a comparatively small quantity of formaldehyde, because if this chemical were added in greater quantity coagulation would take place immediately and it would be manifestly impossible to make use of the compound. In using the smaller quantity of formaldehyde, however, the coagulation is retarded, not taking place until thirty or forty minutes have elapsed after its addition to the mixture. The chemical action of the formaldehyde, whereby the product is rendered insoluble, takes place during the coagulation of the mixture and during the drying of the same. In many instances proteids, albuminoids, or pectic substances can be substituted for the gluten—for instance, caseinogen or casein and such pectic substances as the mucilaginous extracts from the seeds or skins of fruits. Under this head fibrin, fibrinogen, milk, pectose, pectin, pectic or metopectic acid, gum-tragacanth, and similar substances might also be used in special cases.

The formula given above produces, when chemical action takes place, an infusible material which is insoluble in all ordinary solvents, and owing to the presence of sulfurous-acid gas liberated by the breaking up of the sulfites in the glucose and the presence of the formaldehyde is antiseptic and non-fermenting in its nature. The product is, further, non-porous, non-filtrating, possesses the property of swelling and becoming resilient or rubber-like in the presence of various liquids, and owing to its high degree of capillary attraction will remain in such condition when kept moist. Such product may also be rendered soft and rubber-like after it has been dried by the addition of certain syrupy liquids. Instead of subjecting it to the action of moisture or any watery liquid glycerin may be combined with the dried product, and this ingredient serves to establish and maintain a resilient or rubber-like condition.

Having thus described my invention, I claim and desire to secure by Letters Patent—

1. As a new article of manufacture, a composition of matter comprising a glutinous substance, a mucilaginous substance, both of which are soluble in certain liquids, and a filling material in combination with a coagulant which serves to render the glutinous and mucilaginous substances insoluble, the filling material being retained by the insoluble compound.

2. As a new article of manufacture, a composition of matter comprising a glutinous substance, a mucilaginous substance, both of which are soluble in certain liquids, and a filling material in combination with formaldehyde which acts as a coagulant and serves to render the glutinous and mucilaginous substances insoluble, the filling material being retained by the insoluble compound.

3. As a new article of manufacture, a composition of matter comprising a glutinous substance, a mucilaginous substance, both of which are soluble in certain liquids, a filling material, and a toughening agent, in combination with a coagulant which serves to render the glutinous and mucilaginous substances insoluble, the filling material and the toughening agent being retained by the insoluble compound.

4. As a new article of manufacture, a composition of matter comprising a glutinous substance, a mucilaginous substance, both of which are soluble in certain liquids, a filling material, and a toughening agent, in combination with formaldehyde which acts as a coagulant and serves to render the glutinous and mucilaginous substances insoluble, the filling material and the toughening agent being retained by the insoluble compound.

5. As a new article of manufacture, a composition of matter comprising a glutinous substance, a mucilaginous substance, both of which are soluble in suitable acid solutions, and a filling material, in combination with a coagulant which serves to render the glutinous and mucilaginous substances insoluble in the acid solutions, the filling material being retained by the insoluble compound.

6. As a new article of manufacture, a composition of matter comprising a glutinous substance, a mucilaginous substance, both of which are soluble in suitable acid solutions, and a filling material, in combination with formaldehyde which acts as a coagulant and serves to render the glutinous and mucilaginous substances insoluble in the acid solutions, the filling material being retained by the insoluble compound.

7. As a new article of manufacture, a composition of matter comprising a glutinous substance, a mucilaginous substance, both of which are soluble in suitable acid solutions, a filling material, and a toughening agent, in combination with a coagulant which serves to render the glutinous and mucilaginous substances insoluble in the acid solutions, the filling material and the toughening agent being retained by the insoluble compound.

8. As a new article of manufacture, a composition of matter comprising a glutinous substance, a mucilaginous substance, both of which are soluble in suitable acid solutions, a filling material, and a toughening agent, in combination with formaldehyde which acts as a coagulant and serves to render the glutinous and mucilaginous substances insoluble in the acid solutions, the filling material and the toughening agent being retained by the insoluble compound.

9. As a new article of manufacture, an insoluble and infusible compound having a glutinous and mucilaginous base, with a filling material combined therewith, such compound possessing the property of becoming resilient or rubber-like in the presence of moisture.

10. As a new article of manufacture, an insoluble and infusible compound having a glutinous and mucilaginous base, with a filling material and a toughening agent combined therewith, such compound possessing the property of becoming resilient or rubber-like in the presence of moisture.

11. As a new article of manufacture, a composition of matter comprising gluten and gelatin combined with an acid solution, and a coagulant which serves to render the gelatin and gluten insoluble.

12. As a new article of manufacture, a composition of matter comprising gluten and gelatin combined with an acid solution, and formaldehyde, the latter acting as a coagulant and serving also to render the gluten and gelatin insoluble.

13. As a new article of manufacture, a composition of matter composed of gluten, gelatin, a coagulant which serves to render the gluten and gelatin insoluble, and a filling material retained by the insoluble compound.

14. As a new article of manufacture, a composition of matter composed of gluten, gelatin, a coagulant which serves to render the gluten and gelatin insoluble, a filling material and a toughening agent, said filling material and toughening agent being retained by the insoluble compound.

15. As a new article of manufacture, a composition of matter comprising an acid solution, gluten, gelatin, a toughening agent, an earthy filler, water, and a coagulant, in about the proportions named.

16. As a new article of manufacture, a composition of matter comprising an acid solution, gluten, gelatin, a toughening agent, an earthy filler, water and formaldehyde, in about the proportions named.

17. As a new article of manufacture, a composition of matter comprising an acid solution, gluten, gelatin, glucose, an earthy filler, water and a coagulant, in about the proportions named.

18. As a new article of manufacture, a composition of matter comprising an acid solution, gluten, gelatin, glucose, an earthy filler, water and formaldehyde, in about the proportions named.

19. As a new article of manufacture, a composition of matter comprising acetic acid, gluten, gelatin, glucose, an earthy filler, water and a coagulant, in about the proportions named.

20. As a new article of manufacture, a composition of matter comprising acetic acid, gluten, gelatin, glucose, kaolin, water and formaldehyde, in about the proportions named.

21. As a new article of manufacture, a composition of matter comprising acetic acid, gluten, gelatin, glucose, kaolin, water, formaldehyde, and a deodorizing medium, in about the proportions named.

22. As a new article of manufacture, a composition of matter comprising acetic acid, gluten, gelatin, glucose, kaolin, water, formaldehyde, and oil of wintergreen, in about the proportions named.

23. The process of preparing the composition of matter described herein, said process consisting in mixing the soluble ingredients in an acid solution and water, and then adding a coagulant which serves to render the compound insoluble during coagulation and subsequent drying.

24. The process of preparing the composition of matter described herein, said process consisting in mixing the soluble ingredients in an acid solution and water and then adding to the mixture formaldehyde, the latter serving as a coagulant and rendering the compound insoluble during coagulation and subsequent drying.

25. The process of preparing the composition of matter described herein, said process consisting in mixing the soluble ingredients in a suitable liquid in the presence of heat, and then adding a coagulant which serves to render the compound insoluble during coagulation and subsequent drying.

26. The process of preparing the composition of matter described herein, said process consisting in mixing the soluble ingredients in a suitable liquid in the presence of heat, and then adding formaldehyde to the compound, the formaldehyde acting as a coagulant and rendering the compound insoluble during coagulation and subsequent drying.

27. The process of preparing the composition of matter described herein, said process consisting in mixing the soluble ingredients in an acid solution and water in the presence of heat, and then adding a coagulant which serves to render the compound insoluble during coagulation and subsequent drying.

28. The process of preparing the composition of matter described herein, said process consisting in mixing the soluble ingredients in an acid solution and water in the presence of heat, and then adding formaldehyde to the compound, the formaldehyde acting as a coagulant and rendering the compound insoluble during coagulation and subsequent drying.

In testimony whereof I have signed my name to this specification in the presence of two subscribing witnesses.

HENRY A. HUGHES, JR.

Witnesses:
MURRAY C. BOYER,
JOS. H. KLEIN.